(12) United States Patent
Warshauer-Baker et al.

(10) Patent No.: US 11,036,999 B2
(45) Date of Patent: Jun. 15, 2021

(54) AUTONOMOUS VEHICLE THAT IS CONTROLLED BASED UPON OUTPUT OF A BAYESIAN OBJECT CLASSIFIER SYSTEM

(71) Applicant: GM GLOBAL TECHNOLOGY OPERATIONS LLC, Detroit, MI (US)

(72) Inventors: Gabriel Warshauer-Baker, Mountain View, CA (US); Elliot Branson, San Francisco, CA (US); Siddhartho Bhattacharya, Berkeley, CA (US); Haggai Megged Nuchi, San Francisco, CA (US); Mark Liu, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 16/049,756

(22) Filed: Jul. 30, 2018

(65) Prior Publication Data
US 2020/0034634 A1 Jan. 30, 2020

(51) Int. Cl.
| | |
|---|---|
| G06K 9/00 | (2006.01) |
| G06K 9/62 | (2006.01) |
| B60W 30/09 | (2012.01) |
| B60W 10/08 | (2006.01) |
| B60W 10/20 | (2006.01) |
| B60W 10/18 | (2012.01) |

(52) U.S. Cl.
CPC ......... *G06K 9/00791* (2013.01); *B60W 10/08* (2013.01); *B60W 10/18* (2013.01); *B60W 10/20* (2013.01); *B60W 30/09* (2013.01); *G06K 9/6278* (2013.01); *B60W 2420/42* (2013.01); *B60W 2420/52* (2013.01); *B60W 2554/00* (2020.02); *G06K 9/6257* (2013.01)

(58) Field of Classification Search
CPC ............ G06K 9/00791; G06K 9/6278; G06K 9/6257; B60W 10/08; B60W 10/20; B60W 10/18; B60W 30/09; B60W 2420/42; B60W 2550/20; B60W 2420/52
See application file for complete search history.

(56) References Cited

U.S. PATENT DOCUMENTS

| | | | |
|---|---|---|---|
| 9,139,204 B1* | 9/2015 | Zhao | G01C 21/00 |
| 2007/0237398 A1* | 10/2007 | Chang | G06K 9/00369 |
| | | | 382/224 |
| 2012/0062732 A1* | 3/2012 | Marman | H04N 7/18 |
| | | | 348/142 |
| 2016/0171285 A1* | 6/2016 | Kim | G06K 9/00228 |
| | | | 382/103 |

(Continued)

*Primary Examiner* — Navid Ziaeianmehdizadeh
(74) *Attorney, Agent, or Firm* — Medley, Behrens & Lewis, LLC

(57) ABSTRACT

An autonomous vehicle is described herein. The autonomous vehicle includes several different types of sensor systems, such as image, lidar, and radar. The autonomous vehicle additionally includes a computing system that executes several different object classifier modules, wherein the object classifier modules are configured to identify types of objects that are in proximity to the autonomous vehicle based upon outputs of the sensor systems. The computing system additionally executes a Bayesian object classifier system that is configured to receive outputs of the object classifier modules and assign labels to objects captured in sensor signals based upon the outputs of the object classifier modules.

20 Claims, 7 Drawing Sheets

(56) References Cited

U.S. PATENT DOCUMENTS

2018/0190046 A1\* 7/2018 Levinson .............. G01S 15/931
2019/0018418 A1\* 1/2019 Tseng ................... G05D 1/0016
2019/0050692 A1\* 2/2019 Sharma ................ G06K 9/6292

\* cited by examiner

AUTONOMOUS VEHICLE THAT IS CONTROLLED BASED UPON OUTPUT OF A BAYESIAN OBJECT CLASSIFIER SYSTEM

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Conventionally, autonomous vehicles include several object classifier modules that are configured to assign labels to objects based upon different sensor signals. For example, a first object classifier module may be configured to receive images output by a camera and identify types of objects (e.g., pedestrian, bike, car, truck, bus, static object) captured in the images output by the camera, while a second object classifier module may be configured to receive lidar signals output by a lidar sensor and identify types of objects captured in the lidar signals output by the lidar sensor. Therefore, an object in proximity to an autonomous vehicle may be assigned labels by the several object classifier modules, wherein the labels are indicative of the type(s) of the object determined by the several object classifier modules.

In some situations, however, the labels assigned to an object by different object classifier modules may not be consistent with one another. For instance, with respect to an object that is in proximity to the autonomous vehicle, the first object classifier module may assign a first label to the object indicating that the object is a pedestrian, while the second object classifier module may assign a second label to the object indicating that the object is a bike. Conventionally, static, human-generated rules have been used to disambiguate an object type when object classifier modules assign different labels to an object, wherein the rules are created based upon human intuition. An exemplary rule may be as follows: when it is past 6:00 p.m., assign a label of "pedestrian" to an object when the first object classifier module determines that the object is a pedestrian regardless of the outputs of other object classifier modules. This conventional approach is subject to developer bias and/or incorrect intuition, resulting in possible errors with respect to object type classification.

SUMMARY

The following is a brief summary of subject matter that is described in greater detail herein. This summary is not intended to be limiting as to the scope of the claims.

Described herein are various technologies pertaining to controlling operation of an autonomous vehicle. With more specificity, described herein are various technologies pertaining to assigning labels to objects that are captured in sensor signals, wherein the labels are indicative of types of the objects (e.g., pedestrian, bike, car, truck, bus, static object, etc.). With still more specificity, an object classifier system is described herein, wherein the object classifier system includes a plurality of object classifier modules and a Bayesian object classifier system, wherein output of the Bayesian object classifier system is a function of output of at least one object classifier module and observed performance of the object classifier modules over a set of labeled training data.

In an example, the object classifier system includes a first object classifier module that receives a first sensor signal of a first type, wherein the first sensor signal captures an object in proximity to the autonomous vehicle. The first object classifier module is then configured to generate first output that is indicative of a type of the object, wherein, for example, the first output can be a first confidence score distribution over several object types. The object classifier system additionally includes a second object classifier module that receives a second sensor signal of a second type, wherein the second sensor signal captures the object. The second object classifier module is then configured to generate second output that is indicative of a type of the object, wherein, for example, the second output can be a second confidence score distribution over several object types. For instance, the first sensor signal may be output by a lidar sensor and the second sensor signal may be output by a camera.

As indicated previously, the object classifier system further comprises a Bayesian object classifier system that is configured to receive the first output from the first object classifier module and the second output from the second object classifier module. For instance, the first output may be different from the second output (e.g., the output of the first object classifier module may indicate a high confidence that the object is a car, while the output of the second object classifier module may indicate a high confidence that the object is a bike). The Bayesian object classifier system generates third output, wherein the third output is a confidence score distribution over types of objects that the Bayesian object classifier system has been trained upon. The third output from the Bayesian object classifier system is based upon the first output of the object classifier module, the second output of the second object classifier module, and performances of the first and second object classifier modules when identifying types of objects in respective sensor signals with respect to labeled training data. Thus, output of the Bayesian object classifier system is not subject to developer bias.

The Bayesian object classifier system is learned based upon the labeled training data, as referenced above. The labeled training data includes: 1) multiple different types of sensor data (e.g., lidar, radar, image, motion vectors, etc.) generated based upon outputs of different sensor systems; 2) labels manually assigned by human labelers, wherein the labels are assigned to objects captured in the sensor data; and 3) the outputs of the several object classifier modules when the object classifier modules were provided with the appropriate types of sensor data as input. In other words, the Bayesian object classifier system is learned based upon data that is indicative of accuracy of the different object classifier modules with respect to the training data, which can include captures of a relatively large number of different types of objects (in various circumstances).

Thus, for instance, the labeled training data may indicate that a first object classifier module (configured to identify types of objects in image signals generated by a camera) performs very well when an image signal captures a car (e.g., the first object classifier module accurately identifies cars), but is somewhat less accurate when an image signal captures a bike or pedestrian (e.g., the first object classifier module may tend to misidentify a bike as a pedestrian, and vice versa). Contrarily, the labeled training data may indicate that a second object classifier module (configured to identify types of objects in lidar signals generated by a lidar system) performs well when a lidar signal captures a pedestrian and when a lidar signal captures a bike, but is less accurate when a lidar signal captures a truck (e.g., the second object classifier module may tend to misidentify a truck as a car). When learned, the Bayesian object classifier system is fit to such data. Therefore, in operation, when the Bayesian object classifier system receives outputs from the different object classifier modules, the Bayesian object classifier system can generate its own output (e.g., a confidence score distribution over several object types). The autonomous vehicle can then be controlled based upon the output of the Bayesian object classifier system. For instance, the output of the Bayesian object classifier system can be used to control at least one of an engine of the autonomous vehicle, a braking system of the autonomous vehicle, or a steering system of the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
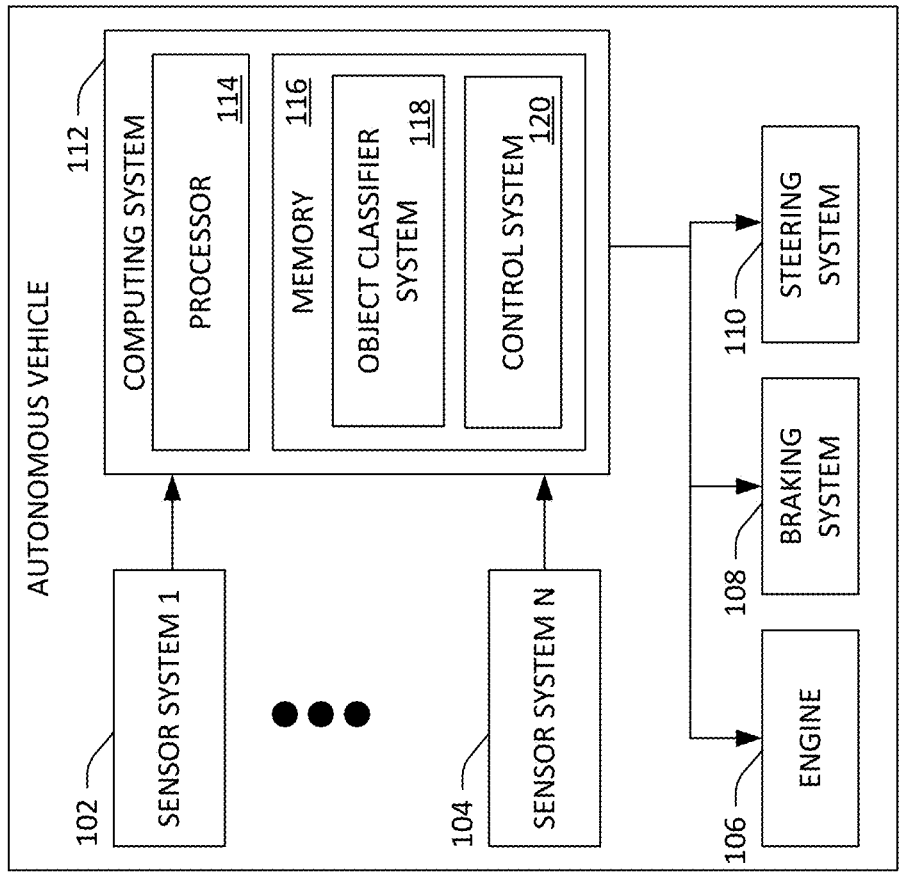
FIG. 1 illustrates an exemplary autonomous vehicle.
Figure 1:
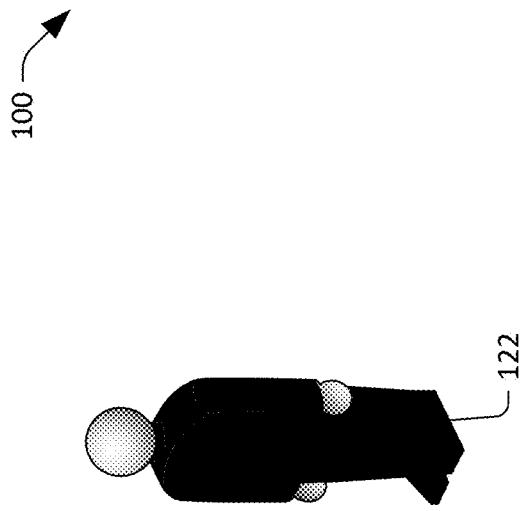

Various technologies pertaining to controlling operation of an autonomous vehicle through use of a Bayesian object classifier system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a lidar sensor system and the Nth sensor system 104 may be a camera (image) system. Other exemplary sensor systems include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the engine 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Figure 2:
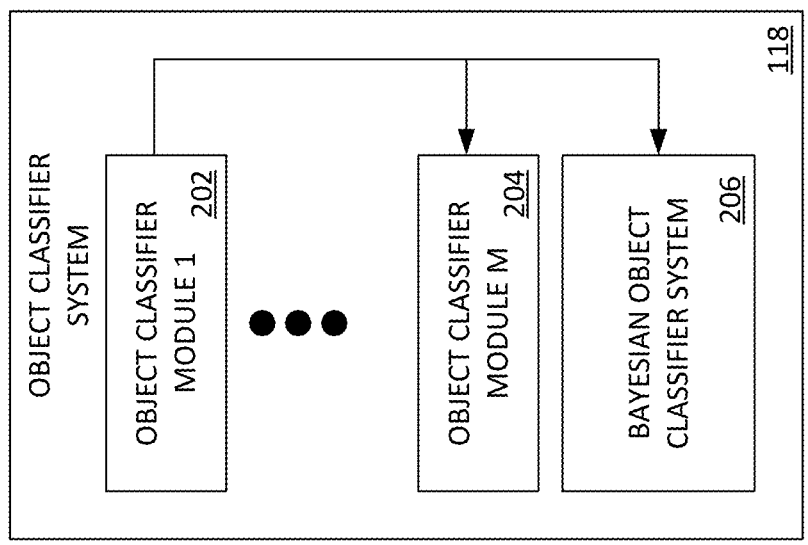
FIG. 2 is a functional block diagram of an exemplary object classifier system included within an autonomous vehicle.

The memory 116 comprises an object classifier system 118 that is configured to assign labels to objects (in proximity to the autonomous vehicle 100) captured in sensor signals output by the sensor systems 102-104. As will be described in greater detail below (and referring briefly to FIG. 2), the object classifier system 118 includes several object classifier modules 202-204 (a first object classifier module 202 through an Mth object classifier module 204) and Bayesian object classifier system 206, wherein the Bayesian object classifier system 206 is configured to output a confidence score distribution over several predefined types of objects. These predefined types of objects can include, but are not limited to, pedestrian, bike, car, truck, bus, and static (unknown), where the type "static" can represent telephone poles, construction equipment, etc. The Bayesian object classifier system 206 is configured to output the confidence score distribution based upon outputs of the several object classifier modules 202-204, where each of the object classifier modules 202-204 independently generates output based upon at least one sensor signal. Hence, the Bayesian object classifier system 206 can be perceived as a voting system that takes into consideration outputs of the different object classifier modules 202-204 and probabilistically identifies a type of an object that is captured in at least one sensor signal output by at least one of the sensor systems 102-104. As will be described in greater detail below, the Bayesian object classifier system 206 is learned based upon outputs of the object classifier modules 202-204 with respect to labeled training data.

The memory 116 additionally includes a control system 120 that is configured to receive output of the object classifier system 118, and is further configured to control at least one of the mechanical systems (the engine 106, the brake system 108, and/or the steering system 110) based upon the output of the object classifier system 118.

Exemplary operation of the autonomous vehicle 100 is now set forth. In this example, a pedestrian 122 is in proximity to the autonomous vehicle 100. The first sensor system 102 can be a camera system that outputs images of surroundings of the autonomous vehicle 100, wherein an image in the images captures the pedestrian 122. The Nth sensor system 104 can be a lidar sensor system that generates lidar signals (that represent the surroundings of the autonomous vehicle 100), wherein a lidar signal in the lidar signals captures the pedestrian 122. The computing system 112 receives the image output by the first sensor system 102 and additionally receives the lidar signal output by the second sensor system 104. As noted above, the object classifier system 118 includes the first object classifier module 202, which (in this example) is configured to receive the image and generate first output, wherein the first output is indicative of a type of the object captured in the image. The first output can be a confidence score distribution (e.g., a first vector of scores) over a plurality of predefined object types (e.g., pedestrian, bike, car, truck, bus, static, etc.).

The Mth object classifier module 204 (included in the object classifier system 118) is configured to receive the lidar signal and generate Mth output, wherein the Mth output is indicative of the type of the object captured in the lidar signal. The Mth output, like the first output, can be a confidence score distribution (e.g., an Mth vector of scores) over predefined object types (which may be the same or different object types). The Bayesian object classifier system 206 receives the first output and the Mth output and generates final output that is based upon the first output, the Mth output, and the performances of the first and Mth object classifier modules with respect to the training data. The final output can be a confidence score distribution (a final vector of scores) over a plurality of predefined object types, wherein these object types may or may not be equivalent to the predefined object types corresponding to the first vector of scores through the Mth vector of scores. The control system 120 receives the final output and controls at least one of the engine 106, the braking system 108, or the steering system 110 based upon the final output. This process repeats as each object classifier module in the object classifier modules 202-204 generates respective output.

The object classifier system 118 described herein exhibits various advantages over the conventional rules-based approach described above. For example, the sensor systems 102 and 104 may output sensor signals at different rates, and the object classifier modules 202-204 may generate outputs at rates that are different from one another. The Bayesian object classifier system 206 is configured to accumulate data output by the object classifier modules 204-206; therefore, one object classifier module which generates output more quickly than another will not control the output of the Bayesian object classifier system 206.

In addition, the types of objects that the object classifier modules 202-204 are configured to identify need not be equivalent to one another or even equivalent to the types of objects over which the Bayesian object classifier system 206 outputs confidence scores. For example, the first object classifier module 202 can be configured to output confidence scores over the object types [pedestrian, bike, car, large vehicle, static], while the Mth object classifier module 204 can be configured to output confidence scores over the object types [pedestrian, bike, car, truck, bus, static]. The Bayesian object classifier system 206 can be configured to output confidence scores over the object types [pedestrian, bike, car, truck, bus, static], even though the first object classifier module 202 does not differentiate between trucks and buses; the Bayesian object classifier system 206 is nevertheless able to employ the output confidence scores of the first object classifier module 202 when generating final confidence scores. For example, the Bayesian object classifier system 206 can "split" the confidence score assigned to "large vehicle" by the first object classifier module 202 between "truck" and "bus" (where the split may be based upon observed numbers of trucks versus observed numbers of buses in training data). Further, the Bayesian object classifier system 206 can accumulate scores from the different object classifier modules when computing a prior probability.

In a nonlimiting example, the first object classifier module 202 outputs a score of 1 for the object type "large vehicle" upon receipt of a first sensor signal, and the Mth object classifier module outputs a score of 0.7 for the object type "bus" and 0.3 to the object type "car". Further, historically, the first object classifier module 202 rarely mislabeled a truck or bus (e.g., a large vehicle) as a car with respect to labeled training data. Thus, the Bayesian object classifier system 206 can output, with relatively high confidence, that the object is a truck rather than a car.

In addition, as mentioned previously, the Bayesian object classifier system 206 outputs confidence scores over object types at any suitable rate, and the Bayesian object classifier system 206 can update the confidence scores each time that output from any of the object classifier modules 202-204 is received. Hence, even if the first object classifier module 202 and the Mth object classifier module 204 output confidence scores over object types at different rates, the Bayesian object classifier system 206 can consider each output from each of the classifier modules when the Bayesian object classifier system 206 generates confidence score outputs.

Figure 3:
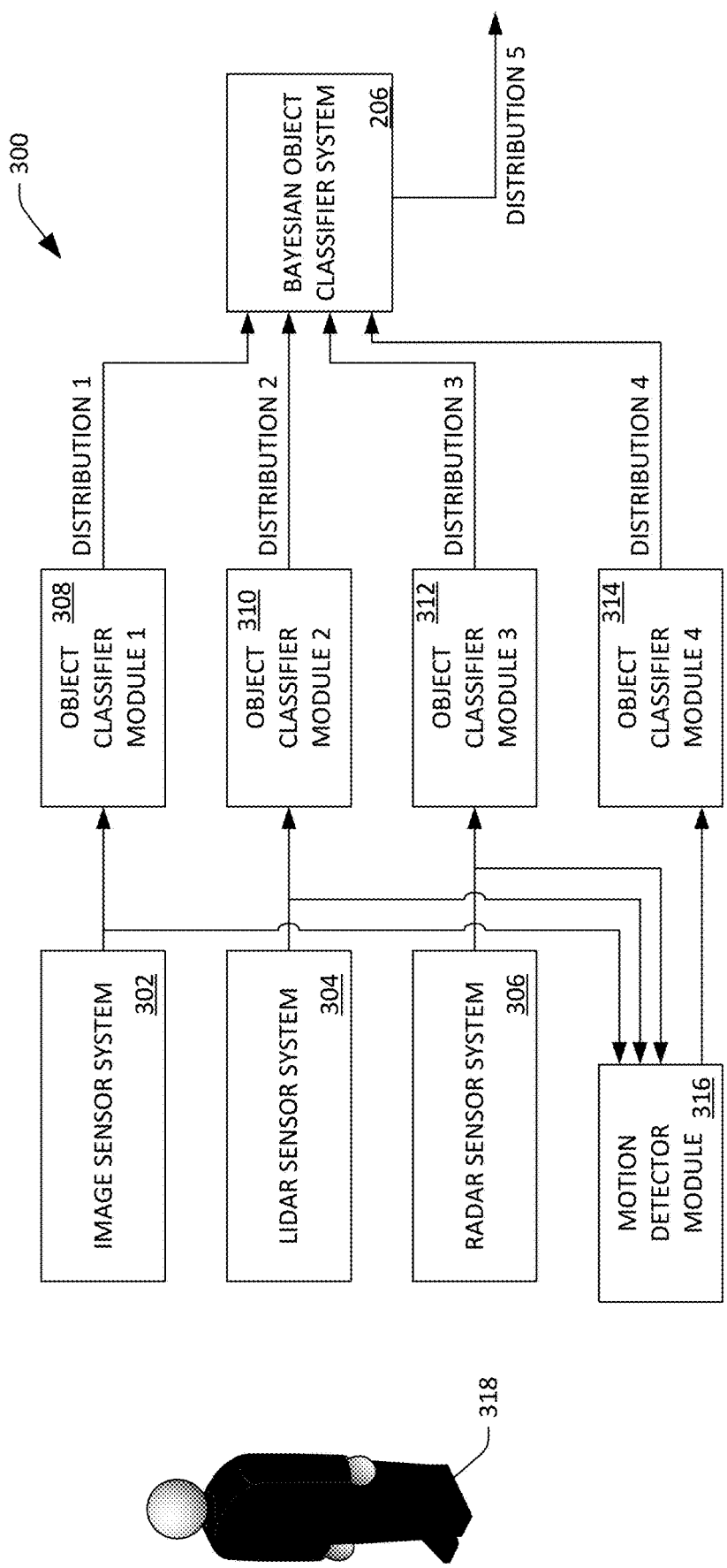
FIG. 3 is a diagram that illustrates an exemplary operation of a Bayesian object classifier system included in an autonomous vehicle.

With reference now to FIG. 3, an exemplary system 300 is illustrated, wherein the exemplary system 300 is configured to output a confidence score distribution over types of objects that are desirably recognized when controlling the autonomous vehicle 100. The system 300 includes an image sensor system 302 (which can include a camera or a plurality of cameras), a lidar sensor system 304, and a radar sensor system 306. The system 300 further comprises a plurality of object classifier modules 308-314. The first object classifier module 308 receives images output from the image sensor system 302 and generates a confidence score distribution over object types that the first object classifier module 308 is configured to identify. Accordingly, when the first object classifier module 308 is configured to identify six different types of objects, the first object classifier module 308 can output a vector of six different scores that sum to 1. As depicted in the system 300, the first object classifier module 308 generates the confidence score distribution based solely upon images received from the image sensor system 302.

The second object classifier module 310 receives lidar scans from the lidar sensor system 304 and based upon a lidar scan in the lidar scans generates a second confidence score distribution over types of objects that are configured to be recognized by the second object classifier module 310. As indicated previously, the types of objects for which the second object classifier module 310 is configured to output confidence scores may be nonidentical to the types of objects for which the first object classifier module 308 is configured to output confidence scores. The Bayesian object classifier system 206 can account for these differences when generating its output. Further, as depicted in FIG. 3, the second object classifier module 310 generates the second confidence score distribution based solely upon lidar scans output by the lidar sensor system 304.

The third object classifier module 312 receives radar scans from the radar sensor system 306 and based upon a radar scan in the radar scans generates a third confidence score distribution over types of objects that are configured to be recognized by the third object classifier module 312. As with the first and second object classifier modules 308 and 310, the types of objects for which the third object classifier module 312 is configured to output confidence scores may be nonidentical to the types of objects for which the first object classifier module 308 and/or the second object classifier modules 310 are configured to output confidence scores. Further, as depicted in this exemplary embodiment, the third object classifier module 312 generates the third confidence score distribution based solely upon radar scans output by the radar sensor system 306.

The system 300 also comprises a motion detector module 316 that is configured to receive output of the image sensor system 302, the lidar sensor system 304, and/or the radar sensor system 306, and is further configured to generate a motion vector that describes motion of an object captured in an image generated by the image sensor system 302, a lidar scan output by the lidar sensor system 304, and/or a radar scan output by the radar sensor system 306. The motion vector generated by the motion detector module 316 can include, for instance, velocity of an object captured in output of one or more of the sensor systems 302-306, rotational velocity of the object captured in output of one or more of the sensor systems 302-306, acceleration of the object as captured in output of one or more of the sensor systems 302-306, and the like. The fourth object classifier module 314 receives the motion vector output by the motion detector module 316 and generates a fourth confidence score distribution over types of objects that the fourth object classifier module 314 is configured to identify (which may be different from the types of objects that one or more of the object classifier modules 308-312 are configured to identify). In the example shown in FIG. 3, the motion detector module 316 generates the motion vector based upon output of the sensor systems 302-306. It is to be understood, however, that the motion detector module 316 may generate the motion vector based upon outputs of any subset of the sensor systems 302-306. Further, the object classifier modules 308-314 may output the confidence score distributions at a same rate or at different rates.

The Bayesian object classifier system 206 receives the confidence score distributions output by the object classifier module 308-314 and generates a fifth confidence score distribution over several types of objects. The Bayesian object classifier system 206 can be configured to output confidence score distributions at a rate set by a developer which may, for instance, at least match the output rate of the object classifier module with the highest output rate from amongst the object classifier modules 308-314. Therefore, the Bayesian object classifier system 206 considers each confidence score distribution output by each of the object classifier modules 308-314 and re-computes the fifth confidence score distribution upon receipt of each of the confidence score distributions output by the object classifier modules 308-314.

An example is now set forth for purposes of explanation. A pedestrian 318 may be in proximity to the autonomous vehicle 100 (e.g., within three hundred feet from the autonomous vehicle 100). The image sensor system 302 outputs an image that captures the pedestrian 318, and the first object classifier module 308 generates a confidence score distribution over several types of objects. For purposes of explanation, in this example, each of the object classifier modules 308-314 can be configured to output confidence score distributions over three types of objects: car, pedestrian, and bike. The first object classifier module 308 may be well-suited to identify cars but may have trouble disambiguating between pedestrians and bikes (based upon observed performance of the first object classifier module 308 over labeled training data). Accordingly, the first object classifier module 308 can output the confidence score distribution of 0 for "car", 0.5 for "pedestrian", and 0.5 for "bike".

The Bayesian object classifier system 206 receives the confidence score distribution output by the first object classifier module 308. The observation that the first object classifier module 308 rarely misidentifies a car can be accounted for in the Bayesian object classifier system 206. Therefore, the confidence score distribution output by the Bayesian object classifier system 206 may, for instance, substantially match the confidence score distribution output by the first object classifier module 308.

Subsequently, the second object classifier module 310 can receive a lidar scan that captures the pedestrian 318 from the lidar sensor system 304. The second object classifier module 310 can be well-suited to disambiguate between pedestrians and bikes but may have difficulty distinguishing between cars and pedestrians (based upon observed performance of the second object classifier module 310 over labeled training data). The second object classifier module 310 can receive a lidar scan that captures the pedestrian 310 and output the confidence score distribution 0.45 for "pedestrian", 0.45 for "car", and 0.1 for "bike". The Bayesian object classifier system 206 receives this confidence score distribution and recomputes its own confidence score distribution based upon the confidence score distribution output by second object classifier module 310. As the performance of the second object classifier module 310 with respect to the training data indicates that the second object classifier module 310 is well-suited to disambiguate between pedestrians and bikes, and as further indicated that there is a relatively high confidence that the object is a pedestrian, the Bayesian object classifier system 206 can accumulate the second confidence score distribution (output by the second object classifier module 310) with the first confidence score distribution (output by the first object classifier module 308) and recompute its own confidence distribution as being 0.8 for "pedestrian", 0.1 for "bike", and 0.1 for "car". The Bayesian object classifier system 206 can continuously update its confidence score distributions as confidence score distributions are received from the object classifier modules 308-314.

Therefore, in the example set forth above, based upon the confidence score distributions output by the object classifier modules 308 and 310, the Bayesian object classifier system 206 can output (with relatively high confidence) that the object (the pedestrian 318) captured in the sensor signals output by the sensor system 302 and 304 is of a type "pedestrian" even though, for instance, the confidence scores for the type "pedestrian" output by modules 302 and 304 for the type "pedestrian" was not above 0.5.

A still more specific example is now set forth for purposes of explanation. Initially, the first object classifier module 308 can generate an output based upon an image output by the image sensor system 302, wherein the output indicates that there is a high confidence (H) that an object represented in the image is a pedestrian, a low confidence (L1) that the object is a car, and a low confidence (L2) that the object is a bike. The Bayesian object classifier system 206 receives this output, and determines how often (in labeled training data) that there was actually a pedestrian, car, and bike when the first object classifier module 308 generated such an output. The Bayesian object classifier system 206 treats measurements received for the object (from the object classifier modules 308-314) previously as part of a prior probability, where such probability is invariant to the order in which the Bayesian object classifier system 206 received the measurements.

Therefore, for instance, P(pedestrian|HL1L2 output from first object classifier module 308)=P (HL1L2|pedestrian)×P (pedestrian)/(P(HL1L2|pedestrian)×P(pedestrian)+P (HL1L2|bike)×P(bike)+P(HL1L2|car)×P(car)), where, generalized, P(measurement$_i$|pedestrian) is determined from observed data (and initializes to P(pedestrian|no previous measurements), which also is determined from observed data. The input to the Bayesian object classification system 206 (e.g., the outputs of the object classifier modules 308-314) can take any suitable form, including discrete (e.g., a "yes" or "no" for each class), discrete with multiple levels of confidence (where such divisions can be tuned or learned), or can be a continuous scalar or vector with several outputs. The Bayesian object classifier system 206 can estimate, from observed data, P(object classifier output|true classification).

Figure 4:
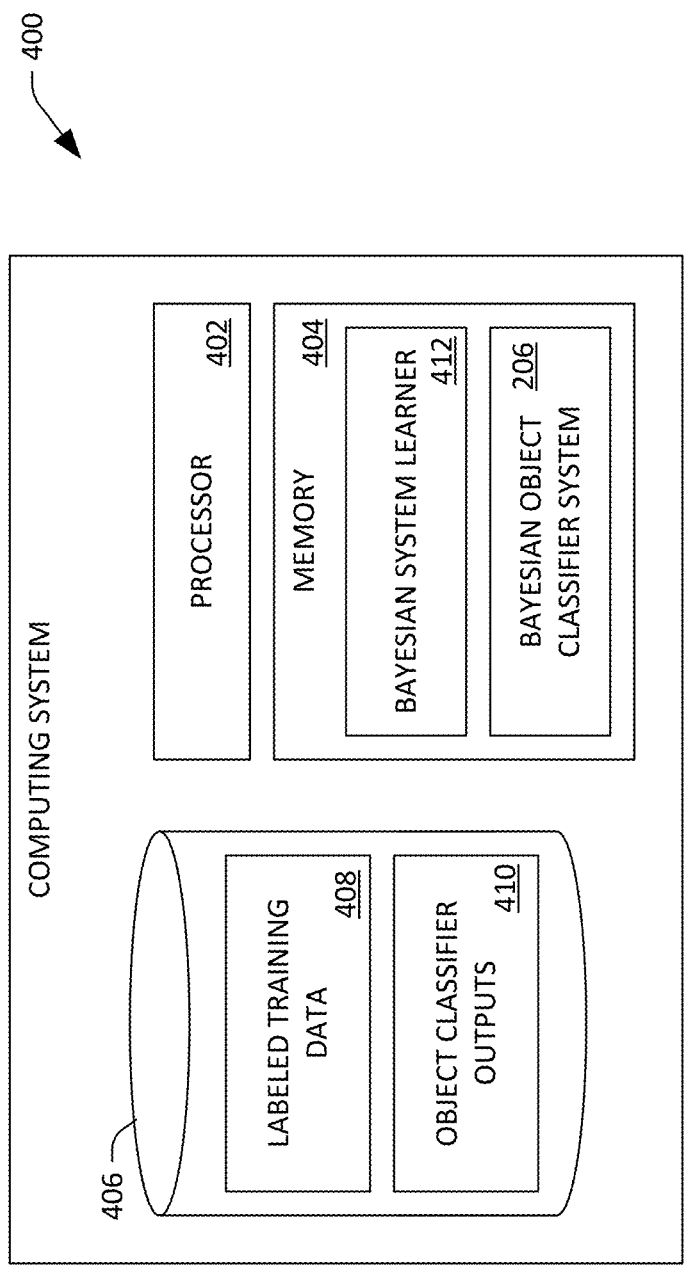
FIG. 4 is a functional block diagram of an exemplary system that is configured to learn the Bayesian object classifier system depicted in FIGS. 2 and 3.

With reference now to FIG. 4, an exemplary computing system 400 that is configured to learn the Bayesian object classifier system 206 is illustrated. The computing system 400 includes a processor 402 and memory 404, wherein the memory 404 includes instructions that are executed by the processor 402. The computing system 400 additionally includes a data store 406 that comprises labeled training data 408 and outputs of a plurality of object classifier modules (e.g., the object classifier modules 308-314) when each of the object classifier modules was provided with at least subsets of the labeled training data 408. For purposes of explanation, the training data 408 is described as being a universal data set. In other words, the labeled training data 408 includes temporally and spatially corresponding sensor data of different types (image, lidar scans, radar scans, motion vectors, etc.). It is to be understood, however, that with respect to learning the Bayesian object classifier system 206, the labeled training data 408 need not be a universal training set. Instead, for instance, when there are four different object classifier modules, the labeled training data 408 may include four different sets of data, one for each of the training modules, wherein the four different sets of data need not temporally or spatially correspond to one another.

The object classifier outputs 410 include outputs of the object classifier modules 308-314 (confidence score distributions) when provided with the labeled training data 408 as input. Further, the labeled training data 408 includes manual labels assigned to objects, thereby indicating a ground truth as to identities of objects that are captured in the labeled training data 408.

The memory 404 includes a Bayesian system learner 412. The Bayesian system learner 412 receives, for each sensor signal (e.g., image, lidar scan, radar, scan, and motion vector) that is labeled in the labeled training data 408 and for each of the respective object classifier modules 308-314, the confidence score distributions output by the object classifier modules 308-314 as well as the labeled ground truth values. The Bayesian system learner 412 then learns the Bayesian object classifier system 206 such that it is fit to the labeled training data 408 and the object classifier outputs 410. Effectively, then, the Bayesian system learner 412 learns a model that assigns appropriate weights to outputs of the object classifier modules 308-314 for the possible outputs and combinations of outputs of the object classifier modules 308-314, such that the Bayesian object classifier system 206 can consider confidence scores in proper context.

As indicated previously, the learned Bayesian object classifier system 206 can be learned to account for the fact that a confidence score of 0.8 for the type "bike" is much different than a confidence score of 0.75 for the type "bike". In other words, the Bayesian object classifier system 206 can be learned to ascertain that there is, in actuality, an extremely high likelihood that an object is of the type "bike" when the score of 0.8 is assigned by the first object classifier module 308 to the type "bike", but there is much lower likelihood that an object is of the type "bike" when the score of 0.75 is assigned by the first object classifier module 308 to the type "bike" (even though there is only a 0.05 difference in the scores). Again, the Bayesian system learner 412 learns the Bayesian object classifier system 206 such that it is fit to the performance of the object classifier modules 308-314 with respect to the labeled training data 408. While not shown, the Bayesian object classifier system 206 can be validated based upon a test training data set, which is also labeled, to ensure that the Bayesian object classifier system 206 is not overfit to the labeled training data 408.

Figure 5:
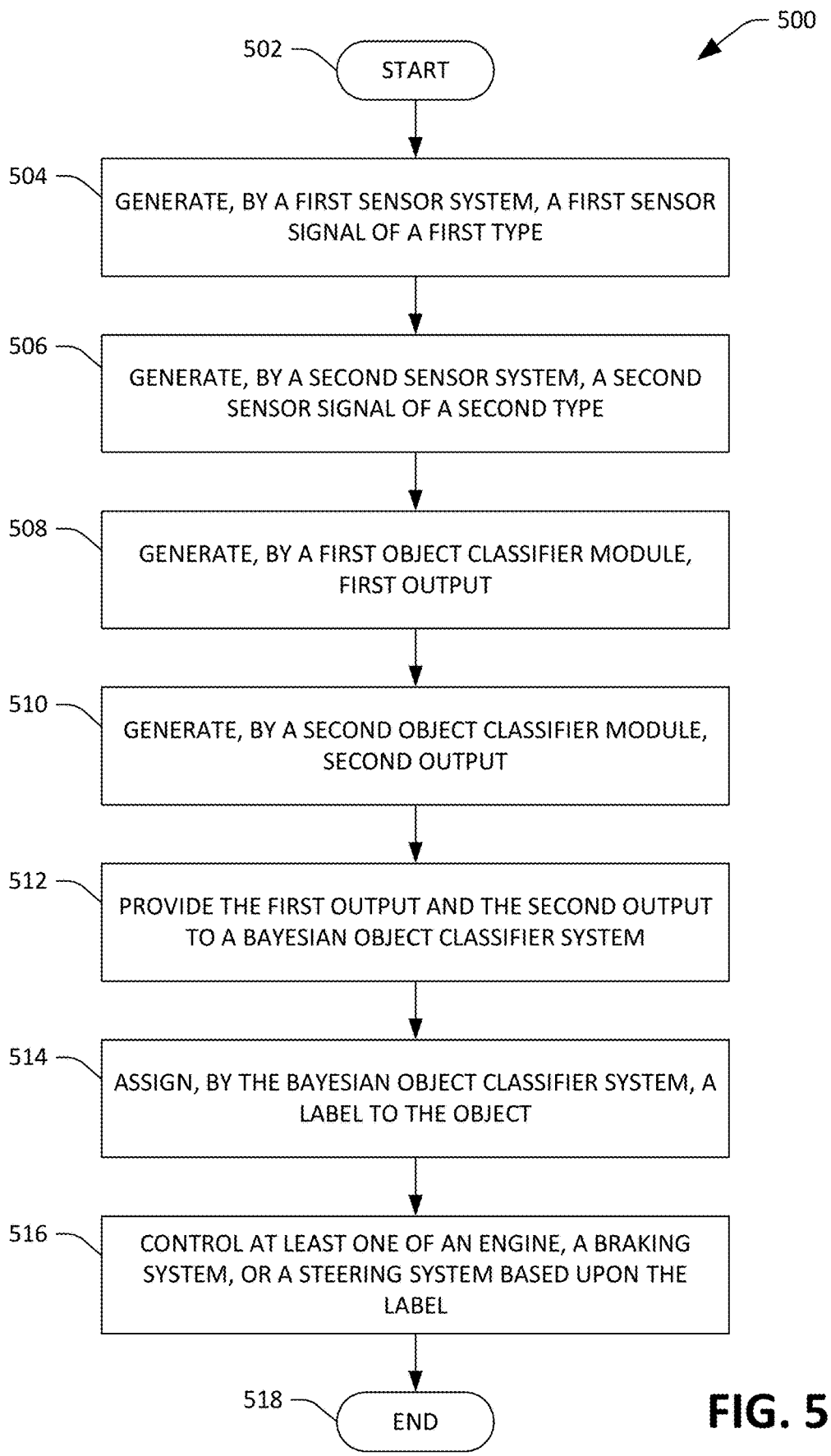
FIG. 5 is a flow diagram illustrating an exemplary methodology for controlling operation of a mechanical system of an autonomous vehicle based upon output of a Bayesian object classifier system.
Figure 6:
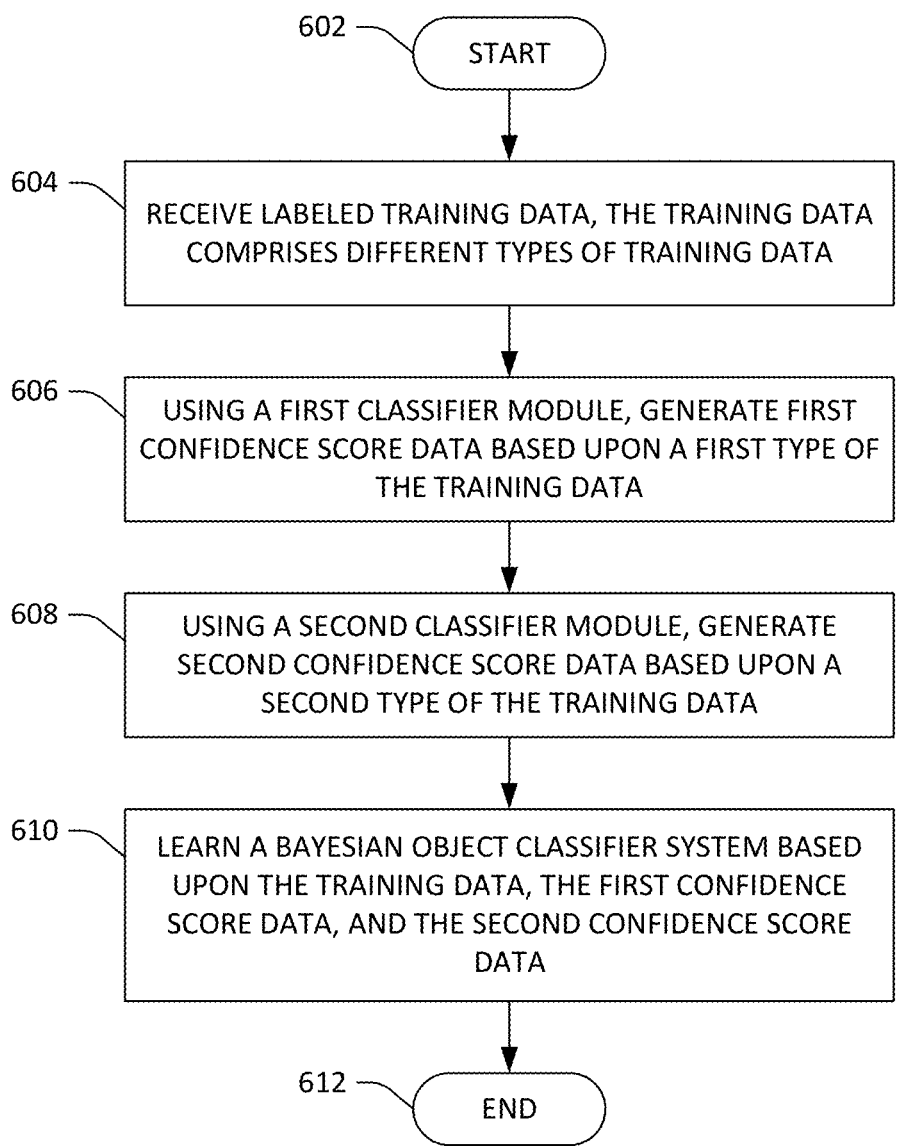
FIG. 6 is a flow diagram illustrating an exemplary methodology for learning a Bayesian object classifier system.

FIGS. 5 and 6 illustrate exemplary methodologies relating to controlling an autonomous vehicle based upon confidence scores output by a Bayesian object classifier system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for controlling operation of an autonomous vehicle is illustrated. The methodology 500 starts at 502, and at 504 a first sensor signal of a first type is generated by a first sensor system, wherein an object in proximity (e.g., within 300 feet) to the autonomous vehicle is captured in the first sensor signal. At 506, a second sensor signal of a second type that is different from the first type is generated by a second sensor system, wherein the object is also captured in the second sensor signal. At 508, first output is generated by a first object classifier module based upon the first sensor signal, wherein the first output is indicative of a type of the object as determined by the first object classifier module. For example, the first output can be a confidence score distribution over types of objects that the first object classifier module is configured to identify.

At 510, second output is generated by a second object classifier module based upon the second sensor signal, wherein the second output is indicative of the type of the object as determined by the second classifier module. Similar to the first output, the second output can be a confidence score distribution over types of objects that the second object classifier module is configured to identify.

At 512, the first output and the second output are provided to a Bayesian object classifier system, and at 514 a label is assigned to the object by the Bayesian object classifier system, wherein the label is indicative of the type of the object as determined by the Bayesian object classifier system, and further wherein the Bayesian object classifier system assigns the label to the object based upon the first output and the second output. In an example, the Bayesian object classifier system can generate a confidence score distribution over several possible types of objects, and can further assign the label to the type that has the highest confidence score assigned thereto. At 516, a mechanical system of the autonomous vehicle is controlled based upon the label assigned to the object by the Bayesian object classifier system. For example, the mechanical system may be one of an engine, a braking system, or a steering system. Further, for instance, when the label indicates that the object is a car and the car is approaching relatively quickly from the left-hand side of the vehicle, the steering system and the braking system can be controlled to slow the autonomous vehicle and veer to the right to ensure that the autonomous vehicle avoids a collision with the car. The autonomous vehicle may be controlled differently when the Bayesian object classifier system indicates that the object is a pedestrian or a static, nonmoving object. The methodology 500 completes at 518.

Turning now to FIG. 6, an exemplary methodology 600 that facilitates learning a Bayesian object classifier system is illustrated, wherein the Bayesian object classifier system is configured for use in an autonomous vehicle. The methodology 600 starts at 602, and at 604 labeled training data is received, wherein the training data comprises different types of training data (e.g. labeled image data, labeled radar scans, labeled lidar scans, etc.). At 606, using a first object classifier module, first confidence score data is generated by providing the first object classifier module with a first type of the training data (e.g., image data rather than radar scans or lidar scans).

At 608, using a second object classifier module, second confidence score data is generated based upon a second type of the training data (e.g. lidar scans rather than image data or radar scans).

At 610, a Bayesian object classifier system is learned based upon the labeled training data, the first confidence score data, and the second confidence score data, such that the Bayesian object classifier system is fit to the labeled training data and the confidence score data output by the first and second object classifier modules. The methodology 600 completes at 612.

Figure 7:
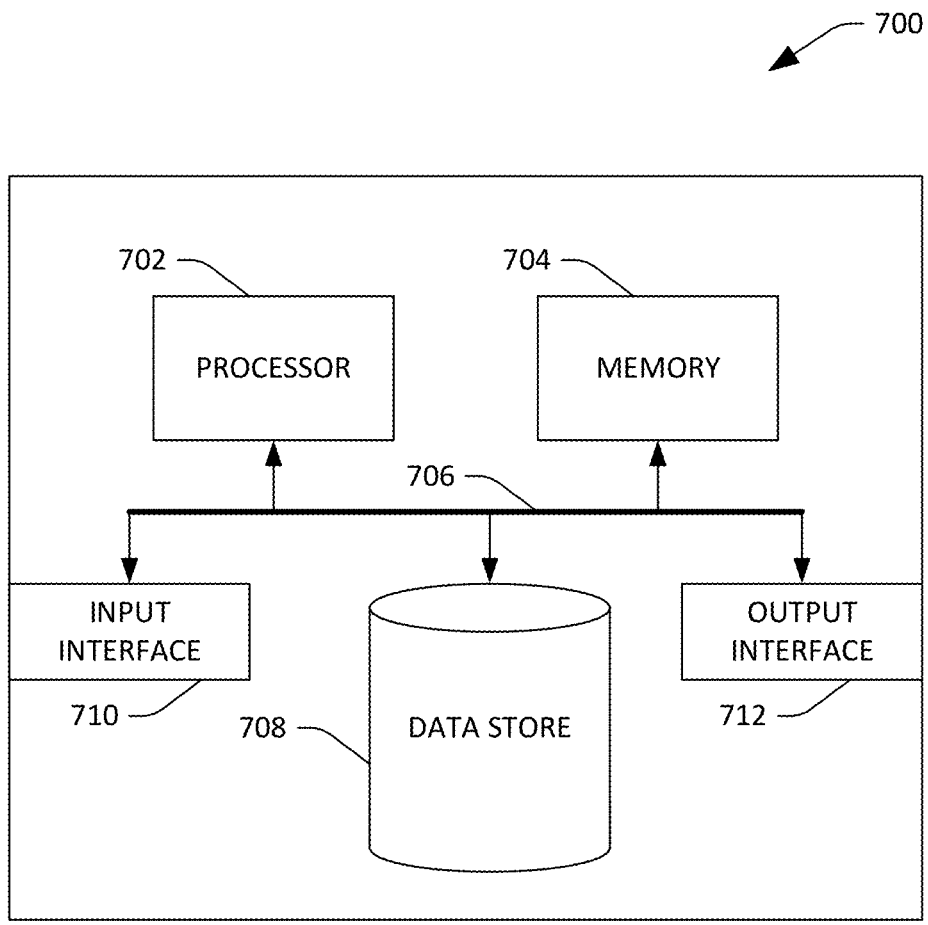
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112 or the computing system 400. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. The processor 702 may be a GPU, a plurality of GPUs, a multi-core processor, etc. The processor 702 may access the memory 704 by way of a system bus 706. In addition to storing executable instructions, the memory 704 may also store confidence scores, prior probability data, sensor data, training data, etc.

The computing device 700 additionally includes a data store 708 that is accessible by the processor 702 by way of the system bus 706. The data store 708 may include executable instructions, sensor data, probability data, training data, confidence scores, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the engine 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
   a motor;
   a first sensor that generates a first sensor signal, wherein the first sensor signal captures an object;
   a second sensor that generates a second sensor signal, wherein the second sensor signal captures the object;
   a computing system that is in communication with the motor, the first sensor, and the second sensor, wherein the computing system comprises:
      a processor; and
      memory that stores instructions that, when executed by the processor, cause the processor to perform acts comprising:
         receiving first output from a first object classifier module, wherein the first output is generated by the first object classifier module based solely upon the first sensor signal, and further wherein the first output comprises a first confidence score distribution over first types of objects;
         receiving second output from a second object classifier module, wherein the second output is generated by the second object classifier module based solely upon the second sensor signal, and further wherein the second output comprises a second confidence score distribution over second types of objects;
         assigning, by a computer-implemented Bayesian object classifier system, a third confidence score distribution over third types of objects, wherein the third confidence score distribution is assigned by the Bayesian object classifier system based upon:
            the first confidence score distribution output by the first object classifier module;
            the second confidence score distribution output by the second object classifier module;
            performances of the first and second object classifier modules when identifying types of objects in respective sensor signals with respect to labeled training data; and
            a confidence score distribution previously output by the computer-implemented Bayesian object classifier system;
         assigning, by the computer-implemented Bayesian object classifier system, a label to the object captured in the first sensor signal and the second sensor signal, the label identifies a type of the object, wherein the label is assigned based upon the third confidence score distribution, and
         controlling the motor based upon the label assigned to the object.

2. The autonomous vehicle of claim 1, wherein first output is generated by the first object classifier module at a first rate, wherein the second output is generated by the second object classifier module at a second rate that is different from the first rate, and further wherein the computer-implemented Bayesian classifier system generates third output based upon each output of the first object classifier module and each output of the second object classifier module.

3. The autonomous vehicle of claim 1, wherein the third types are non-identical to the first predefined set of types and the second predefined set of types.

4. The autonomous vehicle of claim 1, wherein the first sensor is a lidar sensor and the second sensor is a camera.

5. The autonomous vehicle of claim 1, wherein the motor is an electric motor.

6. The autonomous vehicle of claim 1, wherein the third confidence score distribution output by the Bayesian object classifier system is further based upon a fourth confidence score distribution over the third types of objects previously output by the Bayesian object classifier system.

7. The autonomous vehicle of claim 1, wherein the type is one of:
   a pedestrian;
   a car;
   a truck;
   a static object; or
   a bus.

8. The autonomous vehicle of claim 1, wherein performances of the first and second object classifier modules when identifying types of the objects in the respective sensor signals with respect to the labeled training data comprise, for each of the first and second object classifier modules, numbers of times in the labeled training data that the first and second object classifier modules correctly identify objects of the type relative to number of times in the labeled training data indicated that objects of the type were captured in the labeled training data.

9. The autonomous vehicle of claim 1, wherein the third confidence score distribution output by the Bayesian object classifier system is based further upon previous confidence distributions output by the first object classifier module and the second object classifier module.

10. A method performed by an autonomous vehicle, the method comprising:
   generating, by a first sensor system, a first sensor signal of a first type, wherein an object in proximity to the autonomous vehicle is captured in the first sensor signal;

generating, by a second sensor system, a second sensor signal of a second type that is different from the first type, wherein the object is captured in the second sensor signal;
generating, by a first object classifier module, first output based upon the first sensor signal, wherein the first output is a first confidence score distribution over first types of objects;
generating, by a second object classifier module, second output based upon the second sensor signal, wherein the second output is a second confidence score distribution over second types of objects;
providing the first output and the second output to a Bayesian object classifier system;
assigning, by the Bayesian object classifier system, a label to the object, wherein the label is indicative of the type of the object as determined by the Bayesian object classifier system, wherein the label is assigned by the Bayesian classifier system to the object based upon:
the first output;
the second output;
third output previously generated by the Bayesian object classifier system, the third output is a third confidence score distribution over third types of objects; and
performances of the first and second object classifier modules when identifying types of objects in respective sensor signals with respect to labeled training data; and
controlling at least one of an engine, a braking system, or a steering system of the autonomous vehicle based upon the label assigned to the object by the Bayesian object classifier system.

11. The method of claim 10, wherein the first sensor system is a lidar sensor system, and wherein the second sensor system is a radar sensor system.

12. The method of claim 10, wherein the first sensor system is a lidar sensor system, and wherein the second sensor system is a camera system.

13. The method of claim 10, wherein the first types of objects are non-identical to the second types of objects.

14. The method of claim 10, further comprising:
generating, by a third sensor system, a third sensor signal of a third type, wherein the object is captured in the third sensor signal;
generating, by a third object classifier module, fourth output based upon the third sensor signal, wherein the fourth output is fourth confidence score distribution over fourth types of objects; and
providing the fourth confidence score distribution to the Bayesian object classifier system, wherein the label assigned to the object by the Bayesian object classifier system is further based upon the fourth confidence score distribution and performance of the third object classifier module when identifying types of objects in respective sensor signals with respect to labeled training data.

15. The method of claim 14, wherein the first output, the second output, and the third output are provided to the Bayesian object classifier module at different times.

16. The method of claim 14, further comprising:
generating, by a fourth object classifier module, fifth output based upon the third sensor signal, wherein the fifth output is a fifth confidence score distribution over fifth types of objects, wherein the first sensor signal comprises a lidar scan, the second sensor signal comprises a radar scan, and the third sensor signal comprises an image.

17. The method of claim 16, wherein the fourth object classifier module is configured to generate the fifth output based upon an estimated velocity of the object represented in the third sensor signal.

18. A computer-readable storage medium comprising instructions that, when executed by one of more processors, cause the one or more processors to perform actions comprising:
receiving, at a Bayesian object classifier system, a first confidence score distribution output by a first object classifier module, the first confidence score distribution being over first object types, wherein the first confidence score distribution is output by the first object classifier module based upon a first sensor signal generated by a first sensor system, and further wherein the first sensor signal captures an object in proximity to a vehicle;
receiving, at the Bayesian object classifier system, a second confidence score distribution output by a second object classifier module, the second confidence score distribution being over second object types, wherein the second confidence score distribution is output by the second object classifier module based upon a second sensor signal generated by a second sensor, and further wherein the second sensor signal captures the object;
outputting, from the Bayesian object classifier system, a third confidence score distribution over third object types, wherein the third confidence score distribution is output by the Bayesian object classifier system based upon:
the first confidence score distribution;
the second confidence score distribution;
performances of the first and second object classifier modules when identifying types of objects in respective sensor signals with respect to labeled training data; and
a confidence score distribution over the third object types previously output by the Bayesian object classifier system; and
assigning a label to the object based upon the third confidence score distribution output by the Bayesian object classifier system, the label identifying a type of the object from amongst the third object types.

19. The computer-readable storage medium of claim 18, wherein the label is assigned to the object based further upon a fourth confidence score distribution previously output by the first object classifier module, wherein the first object classifier module outputs the fourth confidence score distribution based upon a third sensor signal generated by the first sensor system, wherein the third sensor signal captures the object.

20. The computer-readable storage medium of claim 18, wherein the first sensor is a lidar sensor, and wherein the second sensor is a radar sensor.

* * * * *